United States Patent [19]

Sweers

[11] Patent Number: 4,722,571
[45] Date of Patent: Feb. 2, 1988

[54] BUTTON RETAINER FOR VEHICLE SEAT RECLINER

[75] Inventor: Michael J. Sweers, Williamston, Mich.

[73] Assignee: Chrysler Motors Corporation, Highland Park, Mich.

[21] Appl. No.: 69,798

[22] Filed: Jul. 6, 1987

[51] Int. Cl.$^4$ ............................................. B60N 1/02
[52] U.S. Cl. .................................. 297/367; 297/379; 297/341
[58] Field of Search ............... 297/379, 367, 341, 378, 297/370

[56] References Cited

U.S. PATENT DOCUMENTS

| 3,419,307 | 12/1968 | Strobush | 297/379 |
| 3,572,818 | 3/1971 | Lohr | 297/379 |
| 3,632,168 | 1/1972 | Barello et al. | 297/379 |
| 4,390,208 | 6/1983 | Widmer et al. | 297/379 |
| 4,634,180 | 1/1987 | Zaveri et al. | 297/341 |

Primary Examiner—Francis K. Zugel
Attorney, Agent, or Firm—Edward P. Barthel

[57] ABSTRACT

An actuation button retaining frame member for a vehicle seat adjuster or the like providing quick action installation and positive retention of the button in a panel elongated opening. The frame member is dimensioned for slidable reception on a box-shaped stem portion integral with the button. The frame member has the interior surface of its side elements formed with raised lugs adapted to be slidably received in edge positioning slots of the stem portion. Arcuate shaped runners are formed on the side elements facing the fixed end of the button stem portion. The slots readily position the frame member arcuate-shaped runners in juxtaposed relation to the panel's inner surface providing smooth reciprocal travel of the button along the opening.

3 Claims; 10 Drawing Figures

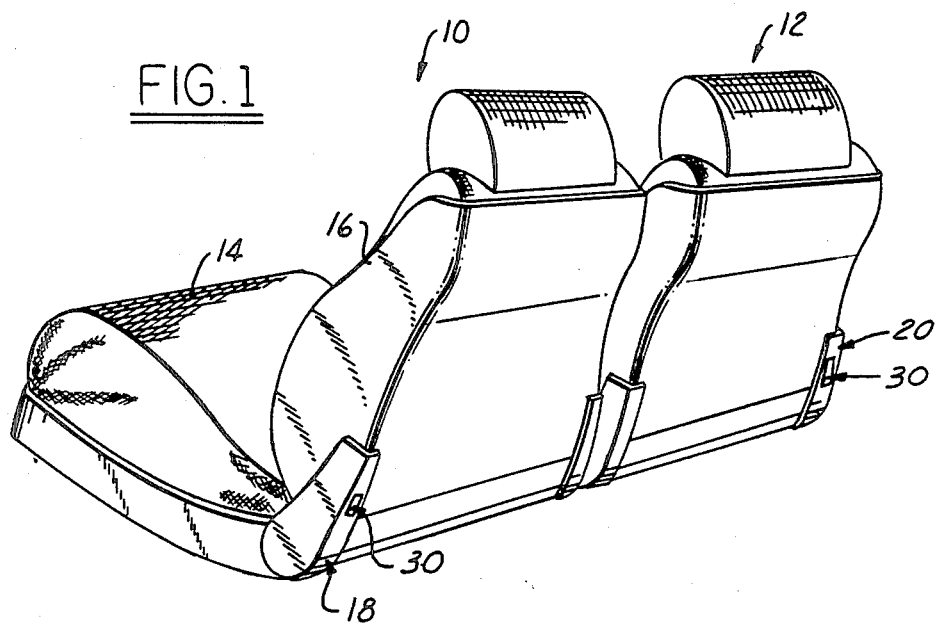
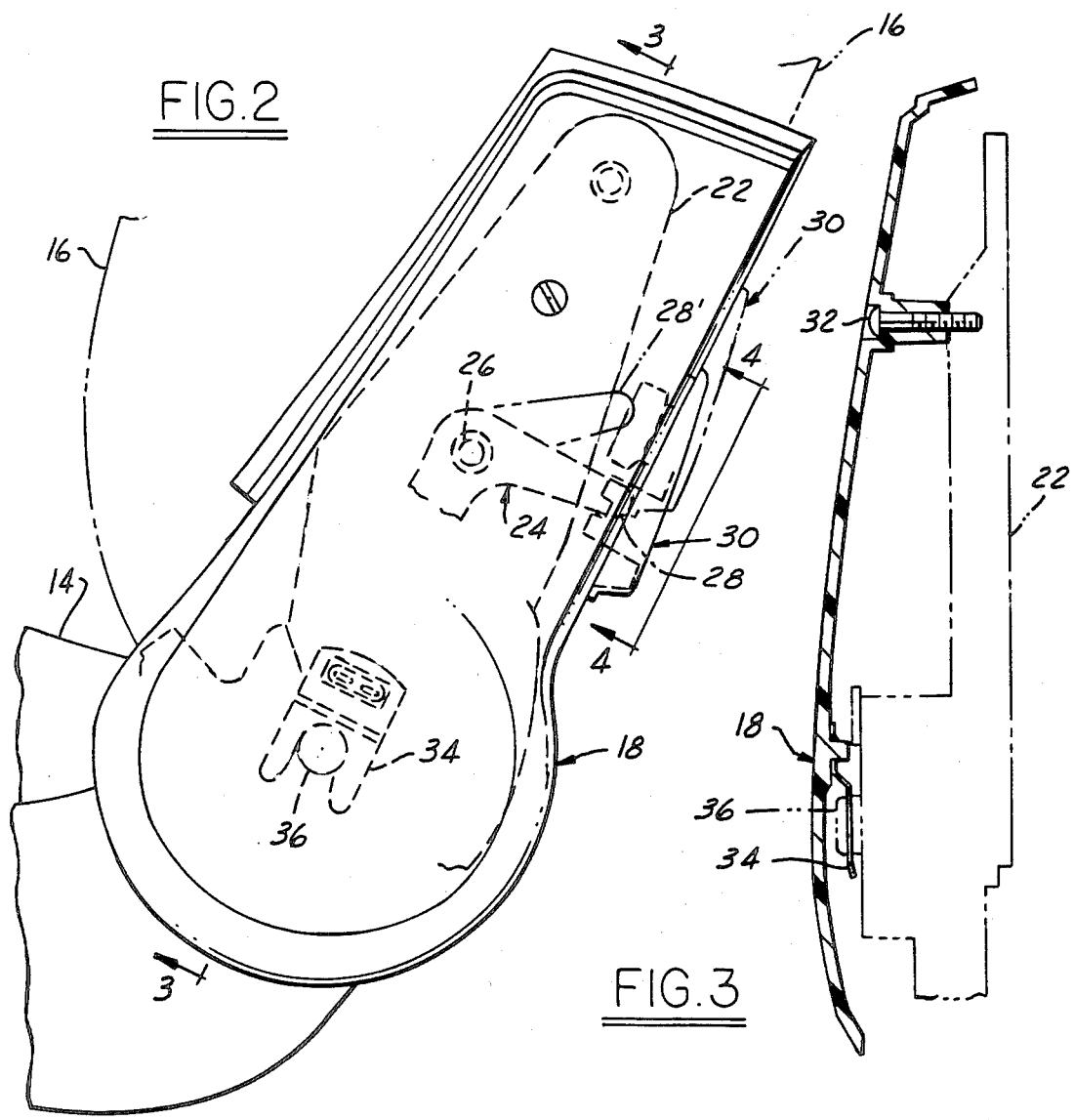

BUTTON RETAINER FOR VEHICLE SEAT RECLINER

BACKGROUND OF THE INVENTION

This invention relates to vehicle seat structures and more particularly to a manually operated seat back adjuster override button retainer.

A prior art override button is mounted fixedly on a seat structure plastic shield panel by means of a metal pushon clip adapted to lockingly engage a stem portion of the button. The clip is intended to contact the inner surface of the shield panel allowing the button to be manually reciprocated over an elongated opening in the panel. The stem portion has its free end open to receive the tongue portion of a manually activated release lever for a seat back adjust mechanism. An example of such a prior art seat latching mechanism is disclosed in U.S. Pat. No. 4,634,180 issued Jan. 6, 1987 to Zaveri et al. Such prior art metal clips have been found to interfere with the smooth travel of the button. Also, such prior art metal clips may fail or come loose thus rendering the button inoperative.

SUMMARY OF THE INVENTION

It is an object of the present invention to construct a button retainer in such a manner that the aforementioned disadvantages are avoided.

The present expedient of a manual adjust button retainer requires no major modification of the mechanism. The present invention presents a simple retainer design which is readily installed to achieve smooth button travel while insuring positive retention during the service life of the seat structure.

Accordingly, the retainer means of the present invention is in the form of a rectangular frame member made from plastic material. The frame member is defined by a pair of spaced apart side elements interconnecting a pair of spaced apart end elements providing opposed parallel internal faces. The frame member is dimensioned for slidable reception on a rectangular sectioned stem member extending through an elongated opening of a plastic shield panel covering a seat back adjust mechanism. The mechanism includes a release lever having a tongue portion positioned adjacent the elongated opening on the inner side of the shield panel. The stem portion free end is open and sized to receive therein the tongue portion such that reciprocal movement of the button causes the stem portion to swing the tongue portion so as to pivot the release lever thereby disengaging the seat back adjuster.

The frame member includes a pair of lugs formed in opposed relation on the inner faces of each of its pair of side elements or lugs. Further, each side element is formed with a convex-shaped arcuate runner which runner extends towards the fixed end of the stem portion. The stem portion is box-sectioned with its open free end defining edge positioning slots located to accommodate the insertion of an associated side element lug to permit each lug to be inserted in its associated slot when the frame member is fitted on the stem portion open end. Each of the positioning slots has a predetermined dimension such that with the lugs fully inserted on their associated slots the runners are positioned in juxtaposed relation to the inner surface of the shield panel. The frame member is fixedly secured to the stem portion as by sonic welding or heat staking whereby the button is retained on the shield panel for smooth reciprocal travel by virtue of each runner sliding adjacent one side edge of the elongated opening.

BRIEF DESCRIPTION OF THE DRAWINGS

The objects, features and advantages of the present invention are readily apparent from the following detailed description of the best mode taken in conjunction with the accompanying drawings in which:

FIG. 1 is a perspective view of a pair of automobile seat structures embodying the seat back adjuster release button of the present invention;

FIG. 2 is an enlarged fragmentary side elevational view of the seat latching mechanism shield panel of FIG. 1;

FIG. 3 is a fragmentary sectional view taken substantially on the line 3—3 of FIG. 2;

DESCRIPTION OF THE PREFERRED EMBODIMENT

Figure 4:
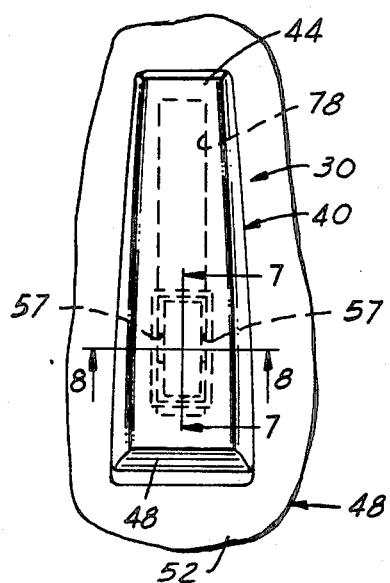
FIG. 4 is an enlarged side elevational view of the actuator button viewed in the direction of the plane 4—4 of FIG. 3.

Referring now to FIG. 1 of the drawings, a pair of side-by-side left and right vehicle seat structures are shown at 10 and 12 positioned in the front or forward portion of a motor vehicle passenger compartment. The left seat structure 10 on the drivers side includes a seat cushion 14 and a seat back 16. The seat cushion 14 is supported on a vehicle floor by a track mechanism (not shown) as disclosed, for example, in the above-mentioned U.S. Pat. No. 4,634,180 the disclosure of which is incorporated by reference herein. A seat latching mechanism of the type shown in the '180 patent is positioned on the rear or outboard side of the vehicle and covered by a shield panel generally indicated at 18 in FIG. 1. A right side shield panel is partially shown at 20 for the seat structure 12. As the parts for seat structures 10 and 12 are mirror images of each other, only the left seat structure will be shown and described.

With reference to FIG. 2, the left shield panel 18 is shown covering a seat latching mechanism shown in outline by hidden lines 22. A portion of a manual release bell-crank lever, as shown in hidden lines at 24, is pivoted about a transverse pivot pin 26. The lever 24 has a tongue portion 28 adapted to be pivoted about pin 26 from a lower position to an upper position 28, indicated by phantom lines in FIG. 2, upon sliding movement of a manual button generally indicated at 30 formed of a plastic material.

FIG. 3 shows the mounting arrangement of the shield panel 18 on the seat structure 10. In the disclosed form the shield panel 18 is secured by an upper machine bolt 32 threaded into a bore of the latch mechanism. The lower end of the shield panel 18 is releasably attached to the latch mechanism by means of a bifurcated metal clip shown at 34, which is captured by a slotted boss 36 in a conventional manner.

Figure 7:
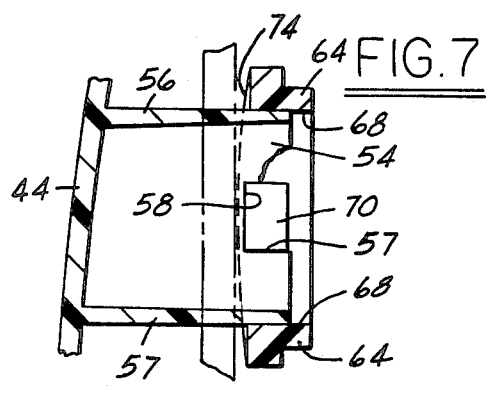
FIG. 7 is an enlarged fragmentary sectional view taken on the line 7—7 of FIG. 4.
Figure 8:
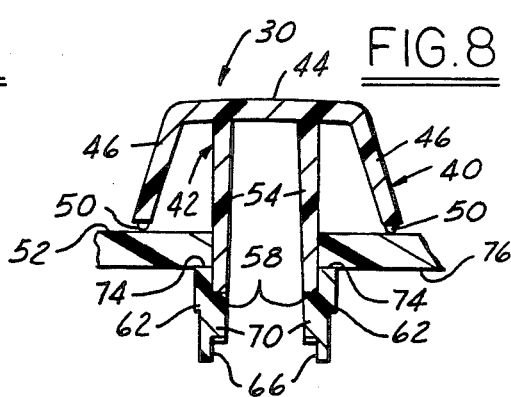
FIG. 8 is an enlarged fragmentary sectional view taken on the line 8—8 of FIG. 4.
Figure 9:
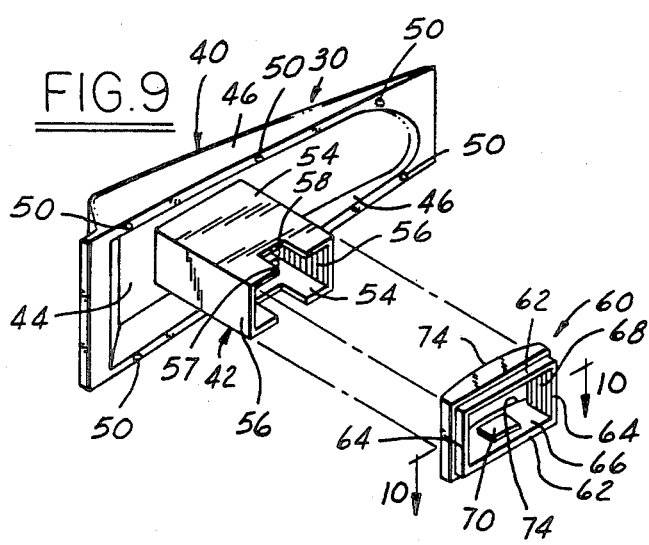
FIG. 9 is an exploded perspective view of the actuator button and frame retainer member of the present invention.

Turning now to FIGS. 4–9, the actuator override button 30 comprises an elongated head portion, indicated generally at 40 and an integral stem portion indicated generally at 42 in FIG. 9. The button head portion includes an inclined long ramp portion 44 having a pair of wedge-shaped sides 46 interconnected by a steep sloped short ramp 48. As seen in FIG. 8, the wedge-shaped sides 46 have their free edges formed with a plurality of paired spacers 50 adapted to slidably ride on outer surface 52 of the shield panel 18 to reduce frictional contact therewith.

Figure 5:
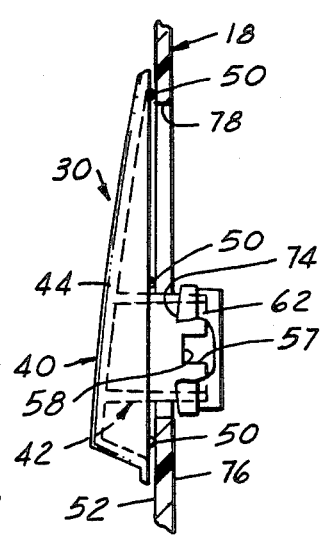
FIG. 5 is a side-elevational view of the actuator button of FIG. 4.
Figure 6:
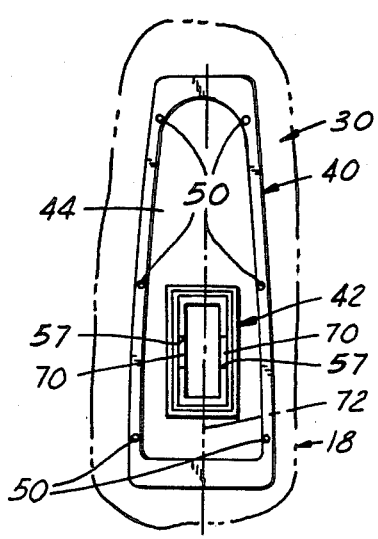
FIG. 6 is a detail elevational view of the underside of the actuator button of FIG. 4.

The actuator button stem portion 42 has a box-shaped hollow rectangular-sectioned configuration with its free distal end open and its proximate or base end integral with the long ramp portion 44. The stem portion 42 is defined by a pair of parallel side walls 54 and a pair of parallel end walls 56. As best seen in FIGS. 5 and 9 each of the sidewalls 54 has means defining an edge positioning slot 57 in opposed symmetrical relation about the longitudinal axis of the button. It will be noted that each positioning slot 57 has a predetermined depth defined by bight-edge 58 for a purpose to be explained.

With reference to FIG. 9 retainer means, in the form of a frame member, generally indicated at 60, is molded from suitable plastic material and dimensioned for slidable reception on the stem-portion free end. The frame member is defined by a pair of spaced apart identical side elements 62 interconnecting a pair of spaced apart end elements 64. It will be seen in FIGS. 8 and 9 that the pair of side elements 62 provide opposed parallel internal planar faces 66. FIG. 7 shows the end elements 64 providing opposed parallel internal planar faces 68.

The planar faces 66 are formed with raised elements or lugs 70 in opposed relation with each other. The lugs 70 are rectangular when viewed in plan and are dimensioned for slidable snug insertion in an associated slot 57 as both the stem portion 42 and the frame member 60 are symmetrical about their longitudinal principal axis shown at 72 in FIG. 6. This permits each lug 70 to be inserted in its associated slot 56 when the frame member 60 is fitted on the stem portion open free end as best seen in FIG. 7.

Each of the side elements 62 is formed with a convex arcuate-shaped runner which extends toward the fixed or proximate end of the stem portion 42 with the frame member received on the stem portion. The predetermined dimension of the slot bight edges 58 is such that with the lugs 70 fully inserted or bottomed-out in their associated slots 56 the runners 74 are exactly positioned in juxtaposed relation to shield panel inner surface 76. The stem portion 42 is initially inserted through an elongated rectangular-shaped opening 78 in the shield panel 18, as seen in FIGS. 7 and 8. Thus, the pair of runners 74 provide line contact with the shield panel inner surface 76. This allows the button to be guided with a minimum of fractional contact as it is manually reciprocated along the elongated opening 78 to position the lever tongue portion at its two operative positions, shown at 28 and 28′ in FIG. 2.

Figure 10:
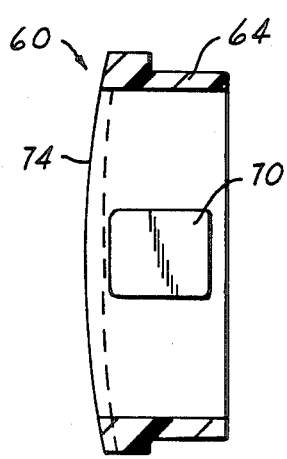
FIG. 10 is an enlarged detail sectional view of the retaining frame member taken on the line 10—10 of FIG. 9.

Upon reception of the frame member 60 on the stem portion free end, the frame member is fixedly secured thereto by suitable heat inducing means such as sonic welding or heat staking. FIG. 10 is an enlarged sectional detail view of the retaining frame member 60.

Although a preferred embodiment of the invention has been illustrated and described in detail, it will be understood that various changes and modifications may be made in the disclosed embodiment without departing from the scope and spirit of the invention as defined in the appended claims.

What is claimed is:

1. A vehicle seat structure comprising a seat back adjuster apparatus having a manually activated release lever including a tongue portion at its one extremity, a panel for covering the seat back adjuster apparatus having an elongated rectangular opening formed therein into which the tongue portion extends, a manually operated actuation button formed with a head portion and an integral rectangular-sectioned stem portion, said stem portion defined by side and end walls providing one open end having free edge portions and having its other end fixed to said head portion, said stem portion projecting axially through said elongated opening, said stem portion open end adapted to receive said tongue portion therein, and retainer means fixed to said stem portion open end so as to capture said stem portion within said elongated slot such that said button may be slidably reciprocated on said panel outer face along said opening to operate said release lever, the improvement wherein:

said retainer means comprising a rectangular shaped frame member formed symmetrical about a longitudinal plane including its principal axis slidably received on said stem portion free open end, said frame member defined by a pair of spaced apart side elements interconnecting a pair of spaced apart end elements with each said pair of side and end elements providing opposed parallel internal faces, a raised lug formed on each said side element internal face in opposed relation to each other, each said side element formed with a convex arcuate-shaped runner facing axially toward said stem portion fixed end; means defining an edge positioning slot in each said stem portion side wall free edge portion accommodating the insertion of an associated lug therein permit each said lug to be inserted in its associated slot with said frame member fitted on said stem portion open end, each said slot having a predetermined axial dimension such that with said lugs bottomed-out in their associated slots said runners being positioned in juxtaposed line-contact relation with the inner surface of said panel, and means fixedly securing said frame member on said stem portion open end such that said actuation button is captured on said shield panel for smooth reciprocal travel in said panel opening with said runners providing minimal frictional contact with said panel inner surface.

2. The retainer means as set forth in claim 1, wherein each said positioning slot having a rectangular shape and each said lug having a mating rectangular shape adapted to be snugly received therein.

3. The retainer means as set forth in claim 1, wherein said frame member molded from plastic material and secured to said stem portion by heat inducing means.

* * * * *